Figure 1:
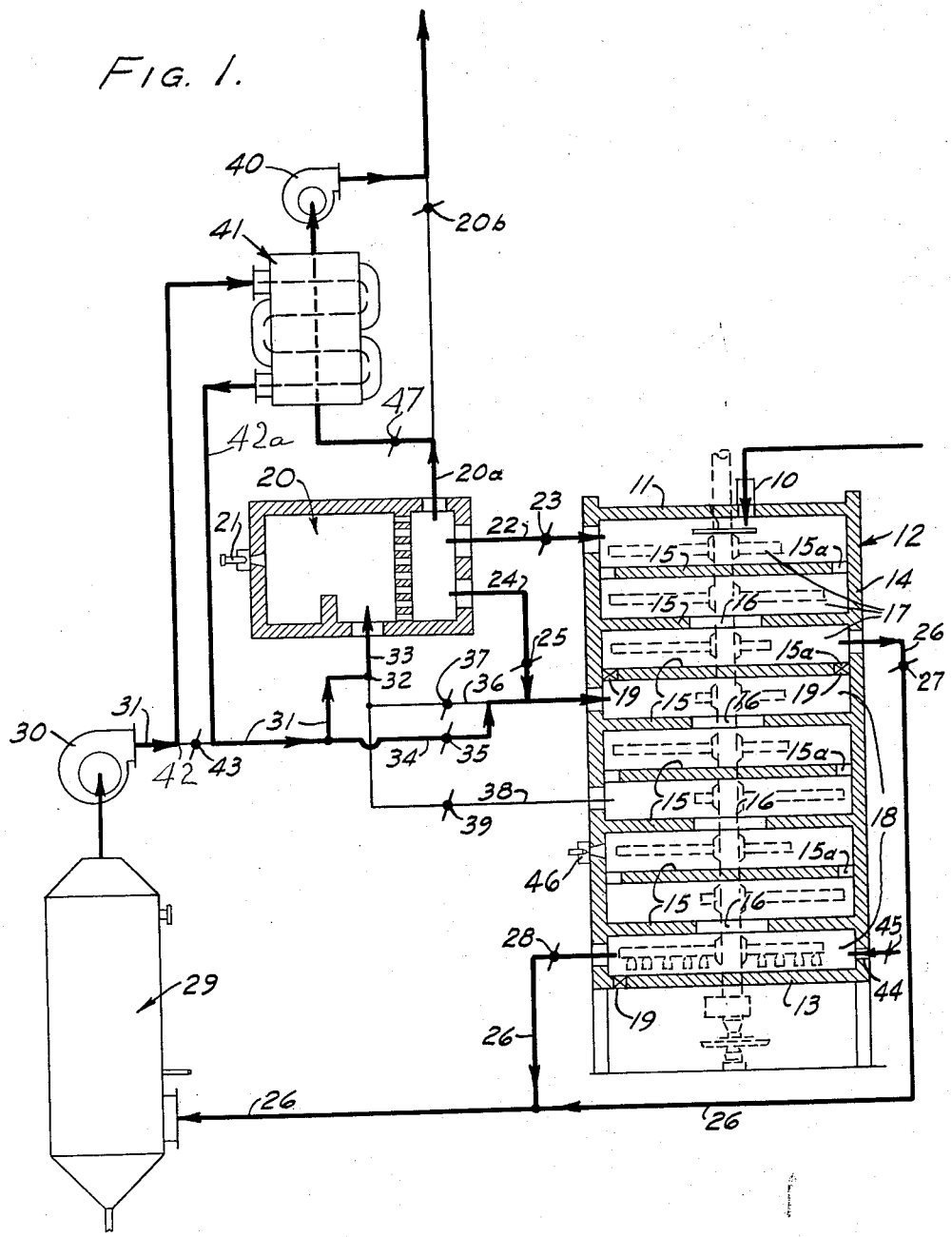

Oct. 20, 1953 W. S. MARTIN 2,655,883
APPARATUS FOR HEAT TREATMENT OF SEWAGE SLUDGE
AND METHOD ADAPTED TO BE CARRIED OUT THEREIN
Filed Jan. 19, 1949 2 Sheets-Sheet 1

INVENTOR
WARREN S. MARTIN
BY Louis L. Ansart
his ATTORNEY

Patented Oct. 20, 1953

2,655,883

UNITED STATES PATENT OFFICE 2,655,883

APPARATUS FOR HEAT TREATMENT OF SEWAGE SLUDGE AND METHOD ADAPTED TO BE CARRIED OUT THEREIN

Warren S. Martin, Massapequa, N. Y.

Application January 19, 1949, Serial No. 71,614

13 Claims. (Cl. 110—8)

The present invention relates to disposition of sewage sludge and the like and more particularly to apparatus adapted for use in drying or in drying and incineration, and to methods of sludge treatment that can be carried out by the improved apparatus.

Due to the impending high cost of fuel and the trend of the Sewage Treatment Plants to sell their sludge as fertilizer, many municipalities demand a unit which is highly efficient for the drying of fertilizer from sewage sludge and which can be quickly changed over to incineration when fertilizer is not in demand.

Based upon the experience gained in previous installations which involved drying of sewage for fertilizer, the drying should be accomplished in at least two stages. The first stage would involve high temperature drying in one section of the apparatus down to a point where the solids become easily scorched and a second stage to be carried out at a lower temperature in a second section. If incineration is to be effected, said second section would be operated at much higher temperatures than for drying.

The drying of fertilizer involves the distillation of the various gases due to fatty acids and so forth which produce very obnoxious odors and in general all of the vapors, resulting from drying, should pass through a high temperature zone, preferably of 1200° F. or higher, before discharge to the atmosphere, in order to deodorize said vapors and gases.

The fuel requirements for raising the vapors to around 1200° F. temperature are extremely high when all of the moisture is contained in these gases. In view of this condition, this system is provided with condensing means such as a spray tower to condense out a greater part of this moisture before entering the deodorization chamber. This unit has been so designed that a quick change over from drying to incineration can be made using the same apparatus but with a different control of the gases and vice versa; and for economy hot gases may be recirculated through one or both sections.

An important object of the invention is to provide a novel and advantageous apparatus for the disposition of sewage sludge and the like.

Another object of the invention is to provide novel and advantageous apparatus for drying sewage sludge and the like.

Still another object of the invention is to provide novel and advantageous apparatus for drying and burning sewage sludge and the like.

Yet another object of the invention is to provide novel and advantageous apparatus adjustable for use to dry sewage sludge and the like or to dry and then incinerate the dried sludge.

A further object of the invention is to provide a two section apparatus of the character specified adapted for recirculation of hot gases through either one or both of said sections.

A still further object of the invention is to provide a novel and advantageous method for drying sewage sludge and the like.

A yet further object of the invention is to provide a novel and advantageous method for drying and then burning sewage sludge and the like.

Figure 2:
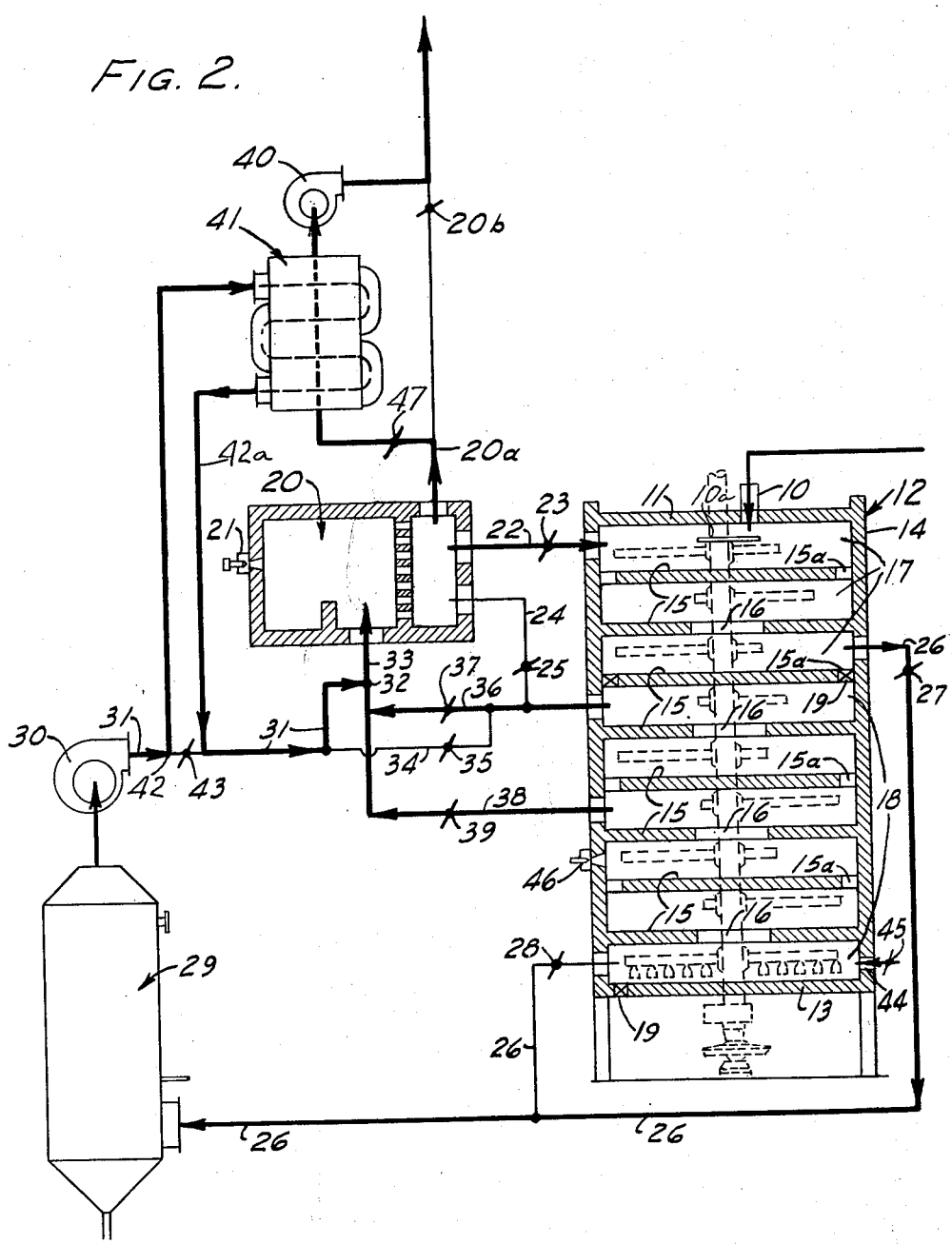

Other objects, features and advantages will appear upon consideration of the following detailed description and of the drawings, in which:

Fig. 1 is a diagrammatic view showing a preferred form of the apparatus aranged for use as a two-stage drier; and Fig. 2 is a view showing the apparatus of Fig. 1 arranged for use with a drying zone or stage and a burning or incinerating zone or stage.

The heavy lines on Fig. 1 indicate the paths of the gases when the apparatus is used as a two-stage dryer and the heavy lines on Fig. 2 indicate the paths followed by the gases when the apparatus is arranged for use with a drying stage and an incinerating stage.

Preferably the sewage sludge to be treated in the present apparatus has had its moisture content reduced to approximately 70% by suitable means comprising, for example a vacuum filter. The moisture content may, however, be much higher or much lower than said 70%.

Referring to the diagrammatic drawings, sewage sludge of approximately 70% moisture content is supplied through a gas seal inlet device 10 in the central part of the roof 11 thereof to a heating unit 12 having a peripheral wall 14. Supported by said wall is a series of nine hearths 15 provided alternately with peripheral drop holes 15a and central drop holes 16. The lowermost hearth 15 serves at the bottom of the unit 12. Above each of said hearths 15 is a compartment of said unit 12. The 70% moisture content of the sludge is given as an example. If the sludge with this content is too sticky for convenient handling, it may be found desirable to add previously dried sludge to reduce the moisture content to say 60%.

Preferably the unit 12 is divided into an upper section 17 and a lower section 18 by providing each peripheral drop hole 15a of the third hearth 15 from the top with a gas seal 19 which allows the solid material to drop therethrough while preventing the passage of gases. Attention is called to the device including elements 30 and 30a at the upper left of Fig. 1 of H. J. Hartley et al. No. 1,640,988, August 30, 1927. It should be understood that material on the various hearths is moved to the various drop holes therein by suitable rabbling means rotating about a vertical axis and that the material is distributed on the uppermost hearth 15 by a distributor 10a. Apparatus of the character just mentioned has been used heretofore for a long time.

The unit 12 may be used as a two-stage drier and hot gases supplied to both stages or sections. To this end, provision may be made of a combustion chamber 20 heated by one or more burners 21 and connected to a stack by a duct 20a provided with a damper 20b. From said combustion chamber gases at 1200° F. are passed to the uppermost compartment of section 17 through a duct 22, the rate of flow being determined by a damper or controller 23. Said combustion chamber 20 is also connected to the uppermost compartment of section 18 by a duct 24 provided with a damper or controller 25. It is, however, desirable to reduce the temperature of said gases to say 600° F. before they enter the lower section 18. The manner of and means for producing this reduction of temperature will be described hereinafter.

The high temperature drying in the upper section 17 is carried on down to a point where the solids are of approximately 40% moisture content and would easily be scorched. Further drying in the lower section 18 is carried out at a lower temperature and reduces the moisture content of the material to about 10%. As illustrated herein the drying is carried out in two stages. A larger number of drying stages might be used to advantage. Experience in prior installation for drying sewage for fertilizer, shows that the drying should be carried out in at least two stages.

The gases and vapors resulting from the drying operation must be withdrawn from said sections 17 and 18. To this end, provision is made of a duct 26 connected to the lowermost compartment of the section 17 under control of a damper 27 and with the lowermost compartment of section 18 under control of a damper 28. It will be evident that the flow of gases and vapors in each section is concurrent with the material flow. It will be evident that the volume of gases and vapors withdrawn from the sections 17 and 18 is very large.

The gases and vapors withdrawn from sections 17 and 18 through duct 26 must be deodorized by subjecting them to a temperature of 1200° F. However, these gases and vapors leave the upper section 17 at about a 300° temperature and the lower section 18 at about 200° temperature, and contain a great deal of moisture. The fuel requirements for raising a mixture of this kind from its relatively low temperature to a high temperature is very high.

However, the fuel requirements may be very much reduced by removing the moisture. This may be done by drawing the gases and vapors in the duct 26 through a spray tower 29 by means of a fan 30 at the far side thereof. This leaves the gases at a temperature of about 100° F. Said fan passes the gases through a duct 31, and at a point 32 into a duct 33 from which the gases and vapors pass into said combustion chamber 20.

Said duct 31 has a branch 34 with a temperature control damper 35 connected to said duct 24 between the damper 25 and the section 18. Through these controls the 100° F. gases and the 1200° F. gases may be mixed in a proportion to produce a temperature of 600° for the gases entering the uppermost compartment of section 18. This temperature is low enough to avoid scorching of the material of 40% moisture content received from the first drying section 17.

At the point 32, the duct 33 is connected through a duct 36 provided with a damper 37, to duct or branch 24, and is connected through a duct 38 having a damper 39, to the third-from-the-top compartment of section 18. During the drying operation, the dampers 37 and 39 are kept closed.

To conserve heat further, at least part of the hot gases from the discharge duct 20a may be drawn by a fan 40 through a heat exchanger 41 to raise at that point the temperature of gases and vapors drawn from the duct 31 at a point 42 and passed through the heat exchange 41 by means of a duct 42a. The gases and vapors thus heated are again returned to the duct 31 at a point separated by a damper 43 from said point 42. The flow to said heat exchange 41 of heating gases from the duct 20a and the flow of gases to be heated, are so regulated that the heating gases passing through the fan 40, are at a temperature in the neighborhood of 800°, which temperature should not be exceeded. Gases at higher temperatures cannot be handled to advantage by the fan.

When the lower section 18 is to be used for incineration, it is necessary to open one or more air inlets 44 which may be closed by devices 45 which may be dampers. If necessary, one or more burners 46 in the wall of a compartment of lower section 18 may be used to start or maintain combustion.

In order to use unit 12 entirely for drying, dampers or valves 45 and 28 in the unit 12 are closed and each burner 46 is turned off. Also dampers 37 and 39 are opened and temperature control damper 35 in branch 34 is closed. Also if gases from the spray tower or scrubber 29 are to pass directly to the combustion chamber 20, the valve or damper 43 in duct 31 is opened. If desired, the damper 43 may be adjusted so as to proportion the flows of gases directly from scrubber 29 to said combustion chamber 20 and from said scrubber 29 through said heat interchanges 41.

With the apparatus arranged as just described for drying only, the operation is as follows: The sludge to be dried is supplied through the top 11 of the unit 12 and subjected to a rabbling operation which causes it to pass downwardly through the drop holes or outlets of the intermediate hearths in the upper section and through one or more gas valves 19 in a hearth 15 which is the bottom of the upper section 17 and the top of the second or lower section 18. In said section 18 the material passes downwardly from hearth to hearth and finally out of this section through one or more gas valves or outlets 19 in the lowermost hearth or bottom of said section 18.

In each of sections 17 and 18, the drying is effected by supplying hot gases to the uppermost compartment and withdrawing gases and vapor from the lowermost compartment. The flow of gases and vapor is thus concurrent with the downward movement of the material being dried. In both sections moisture in the material or sludge is turned into vapor of which there is a large volume.

The gases and vapors withdrawn from the sections 17 and 18 are at temperatures very much lower than those of the gases originally supplied, and are almost certain to carry noxious odors and must be deodorized by subjecting them to a temperature of 1200° F. In order to facilitate the raising of the gases to this temperature, such gases and vapors from said sections 17 and 18, are passed through the condenser and scrubber 29 where the vapors are condensed and drawn off. The gases and vapors emerging from the scrubber are at a temperature of about 100° F. The fan or blower 30 in the discharge line 31 not only draws gases and vapors from the sections 17 and 18 into the scrubber 29 but passes at least part of these gases to a combustion chamber 20 where a deodorizing temperature of 1200° F. or more is maintained, as by means of one or more burners 21. A portion of the hot gases in said combustion chamber 20 is utilized in the heating sections and the rest passes directly to a stack or indirectly where at least a part is used in a heat exchanger 41 to preheat gases and vapors from the scrubber 29 before they enter the combustion chamber.

Hot gases at 1200° F. pass from the combustion chamber 20 to the uppermost compartment of section 17, through a duct 22 controlled by a damper 23. In passing downwardly through section 17, the temperature of these gases drops to about 300° F. before entering said duct 26. Also hot gases at 1200° F. pass from combustion chamber 20 into a duct 24 leading to the uppermost compartment of the second drying section 18. Said temperature of 1200° F. is entirely too high for gases to be introduced into the uppermost compartment of said second section 18. The material at this point is so dry that it would be scorched at that temperature. However, by mixing a limited flow of gases at 1200° F. under control of damper 25 in duct 24, with gases at 100° supplied from line 31 through a branch 34 under control of a damper 35, a mixture at 600° F. may be supplied to the uppermost compartment of section 18. Effective drying may be obtained in this way.

If the second section 18 of heating unit 12 is to be used for incineration, dampers 25, 28 and 35 are closed and dampers 37 and 39 opened. The drying operation of the upper section 17 remains unchanged, but no hot gases from the combustion chamber enter said second section 18 and the incineration there is started by opening one or more dampers 45 to admit air to the lowermost compartment and putting into use one or more burners 46. In some instances the burning material in the section 18 may generate sufficient heat to keep the apparatus in operation.

In the section 18, the gases of combustion flow upwardly counter-currently to the downward flow of material. From the uppermost compartment of section 18 the hot gases at a temperature of say 1730° pass through parts of ducts 24 and 36 to duct 33 leading to the combustion chamber 20. Obviously the gases at 100° supplied through the duct 31 when mixed with the gases at 1730° F. may provide a mixture at less than 1200°. Combustion gases from the third compartment of section 18 below the top are passed to duct 33 through the duct 38 under control of damper 39, and are mixed with cooler gases in said duct 33.

Obviously the apparatus can be used effectively either for drying only or for drying and incineration.

In the operation of the apparatus as a two-stage drier, gases and vapors from both stages or sections are passed through the spray tower or scrubber 29 where they lose a large percentage of the contained moisture, and then into the combustion chamber 20. These gases leave said spray tower at a temperature of about 100° F. The combustion chamber is supplied with auxiliary heat by suitable means such as oil or gas burners 21. The combustion gases provided in this way heat the 100° F. gases from the scrubber to 1200° F. Part of these gases are recycled through the drying section 17 on the furnace and the excess gases which are equivalent to those produced by the fuel burners are exhausted to the stack.

When the apparatus is used for incineration the only recycling of gases is exclusively through the first drying stage or section 17.

Most of the values assigned to temperatures at different points and to percentages of moisture have been given for the purpose of illustration, and may be varied considerably. It is important, however, to use a suitable deodorizing temperature such as 1200° F. or higher.

In certain sewage disposal plants, it may be necessary to dry and incinerate sewage sludge without preliminary mechanical dewatering. In such a case, the sewage sludge would be introduced into the drying and incinerating apparatus with about ninety-two per cent moisture content. Under such circumstances, the connections might be varied from those in Fig. 1 to a greater extent than in Fig. 2. For example, valve 39 could be completely closed, the valve 43 could be fully open and valve 20b could be fully open. Furthermore, the fan 40 may be shut off and connection thereto from duct 20a may be shut off by means of a damper 47. For this purpose it is proposed to use only two burning hearths below the hearth having the gas valves 19.

Gases of combustion in the combustion chamber 20 are supplied at 1200° F. to the uppermost compartment of the drying section 17 and are passed downwardly through the second and third compartments and out of the latter at a temperature of 300° F. At the same time, dried sludge is passed downwardly through the gas valves 15a into the lower set of compartments where the sludge is burned at 1875° F.

Due to the large moisture content of the sludge, a large volume of vapor is generated in the drying section and with other gases is passed through the duct 26 to the scrubber 29 where its temperature is lowered to about 100° F. and the vapor is condensed and removed. The gases passing from the scrubber at 100° F. and the hot gases at 1875° F. from the burning section, are combined into a mixture of which the temperature is considerably below 1200° F. The mixture is then heated to 1200° F. in the combustion chamber 20 from which part of the mixture passes to the stack and the rest is recirculated through duct 22, the drying section 17 and the scrubber.

From observations of the operations of plants using scrubbers, it appears that gases scrubbed by water can safely be discharged to the atmosphere at lower temperatures than for unscrubbed gases. In fact it appears that good results can be obtained not only by discharging gases between 1100° F. and 1300° F. but also at temperatures much lower than 1100° F. and much higher than 1300° F.

Of course the recirculation of gases through either one or both sections is of considerable importance. Also it will be evident that it is not essential to mix the gases from the scrubber with the hot gases from the incinerating section, and the gases from the various locations may be supplied to the combustion chamber separately.

The percentage of water content of the sludge may vary considerably. In that event, it might be advisable to vary the temperature in the combustion chamber and of the gases passed therefrom and/or the time it takes to pass through a drying or burning zone.

It should be understood that various changes may be made and that various features may be used without others, without departing from the true scope and spirit of the invention.

What is claimed is:

1. Apparatus adapted to effect drying in two stages and to effect drying and incineration in two stages, comprising a multiple hearth heating unit comprising a top, a bottom and hearths therebetween dividing the unit into compartments, said top, hearths, and bottom being provided alternately from top to bottom with central and peripheral passages for downward flow of material, means for feeding the material on said hearths toward the corresponding passages therein and through same, and one intermediate hearth having a gas seal for each peripheral passage to divide the unit into upper and lower sections, said gas seal permitting downward flow of material while preventing the flow of gases therethrough; in combination with a separate combustion chamber having means to discharge excess gases to the outside air; a duct for each of said sections having a damper therein connecting said combustion chamber with an upper compartment of the corresponding section; a scrubber; a duct having a damper connecting a lower compartment of each of said sections to said scrubber; ducts provided with dampers connecting said scrubber to the combustion chamber and to an upper compartment of said lower section; air inlet means in the lower part of said lower section; a duct provided with a normally closed damper connecting an intermediate compartment of said lower section with said combustion chamber, and burner means in the lower part of said lower section.

2. The combination according to claim 1 wherein there is a reheating heat exchanger in the duct connecting the scrubber to the combustion chamber, said heat exchanger being adapted to supply heat to the gases flowing from the scrubber to the combustion chamber.

3. The combination according to claim 1 wherein the apparatus is adjusted for two-stage drying, the damper in said duct from the combustion chamber to the upper compartment of said lower section being set in open position, and the damper being open in said duct connecting the scrubber to the upper compartment of said lower section.

4. The combination according to claim 1 wherein the apparatus includes a duct connecting an intermediate compartment of said lower section to said combustion chamber and the apparatus is adjusted for drying in said upper section and incineration in said lower section, the damper being closed in the duct connecting the combustion chamber to an upper compartment of said lower section, the damper in the duct connecting said lower compartment of the lower section to the scrubber being closed to shut the same off from the scrubber, the damper in the duct connecting said upper compartment of the lower section to the combustion chamber being closed and the damper in the duct connecting an intermediate compartment of said lower section to said combustion chamber being open.

5. A multiple hearth heating unit having a top, a bottom and hearths therebetween dividing the unit into compartments, said top, hearths and bottom being provided alternately with central and peripheral passages for downward flow of material and one intermediate hearth having a gas seal for each peripheral passage thereof to divide the unit into upper and lower sections, said gas seal permitting downward flow of material while preventing the flow of gas therethrough, and means for moving material on said hearths to the corresponding passage therein; a separate combustion chamber; a scrubber; means for supplying hot gases from the combustion chamber to the uppermost compartment of said upper section in combination with means for supplying hot gases from said combustion chamber to an upper compartment of said lower section; means for withdrawing gases and vapors from the lower parts of said sections and passing them through the scrubber; said means for supplying hot gases to said upper compartment of said lower section being connected to said combustion chamber and said scrubber to withdraw hot gases from the combustion chamber and cooler gases from the scrubber; and means for passing excess gases from the scrubber into the combustion chamber whereby portions of the scrubbed gases will be recycled through said sections.

6. A multiple hearth heating unit having a top, a bottom and hearths therebetween dividing the unit into compartments, said top hearths and bottom being provided alternately with central and peripheral passages for downward flow of material and one intermediate hearth having a gas seal for each passage therethrough to divide the unit into an upper drying section and a lower incinerating section provided with at least one burner, said gas seal permitting downward flow of material while preventing the flow of gas therethrough; means for moving material on said hearths to the corresponding passages therein; a separate combustion chamber, and a scrubber; in combination with means for supplying hot gases from the combustion chamber to said upper section, means for withdrawing the gases at a lower temperature from said upper section and passing them through the scrubber; and means for withdrawing gases from the upper part of said lower section and from said scrubber and supplying them to said combustion chamber.

7. The method of drying material such as sewage sludge, comprising passing said material through a first group of successive drying stages, effecting combustion in a combustion zone, passing a current of hot gases from a combustion zone through said drying stages concurrently with said material and discharging from said group at a lower temperature gases and vapors taken up by said current of hot gases; together with the steps of passing the partially dried material from the first group of drying stages through the stages of a second group, passing another current of hot gases partly from said combustion zone through said second group concurrently with said material and discharging at a lower temperature said gases with vapors taken up thereby, scrubbing the gases and vapors discharged from the two groups thus cooling the same, passing scrubbed gases to said combustion zone for reheating to provide part of the hot gases passed from said combustion zone into the first group, and passing hot gases from the combustion zone and the remaining scrubbed gases to said second group.

8. The method of drying sewage sludge having a water content of sixty per cent or higher, comprising passing said sludge through a first drying zone and then through a second drying zone while preventing the flow of gases and vapors therebetween, effecting combustion in a combustion zone to maintain gases therein at a deodorizing temperature, passing gases from the combustion zone into and through the first drying zone and gases from the combustion zone into and through the second drying zone at a temperature such as to avoid scorching, scrubbing gases and vapors discharged from said drying zones to condense the vapors and cool the remaining gases, passing part of such cooled gases into the second drying zone for recirculation therethrough, passing the remaining cooled gases to the combustion zone for reheating, recirculating part of such reheated gases through the first drying zone, and discharging the remainder of the gases from the combustion chamber to the outside air.

9. The method according to claim 8 wherein the moisture content of the sludge to be treated is of the order of seventy per cent, the temperature in the combustion zone is of the order of 1200° F., the temperature of the gases from the scrubbing operation is of the order of 100° F., and the temperature of the gases introduced into the second drying zone is of the order of 800° F.

10. The method of drying and burning partially dried sewage sludge, comprising passing said sludge through a drying zone and then through an incinerating zone while preventing the flow of gases and vapors therebetween, effecting combustion in a combustion zone to maintain gases in said combustion zone at deodorizing temperature, passing gases from the combustion zone into the drying zone, scrubbing gases and vapors from said drying zone to condense the vapors and discharge cooled gases, incinerating the dried material from the drying zone in the incinerating zone and discharging gases of combustion therefrom and passing the gases from the incineration zone and the scrubbed gases into the combustion zone.

11. The method of drying and burning partially dried sewage sludge, comprising passing said sludge through a drying zone and then through an incineration zone while preventing the flow of gases and vapors therebetween, effecting combustion in a combustion zone to maintain gases in a combustion zone at said deodorizing temperature, passing gases from the combustion zone into the drying zone, scrubbing gases and vapors from said drying zone to condense the vapors and discharge gases at a lower temperature, incinerating the dried material from the drying zone into the incinerating zone and discharging therefrom gases of combustion at a high temperature, and passing such high temperature gases and the cooled gases from the scrubber into said combustion zone.

12. Apparatus adapted to effect drying in two stages and to effect drying and incineration in two stages, comprising a multiple hearth heating unit having a top, a bottom and hearths therebetween dividing the unit into compartments, said top, hearths and bottom being provided alternately from top to bottom with central and peripheral passages for downward flow of material, and an intermediate hearth having a gas seal for each peripheral passage to divide the unit into an upper section and a lower section having air inlet means and heating means, said gas seal permitting downward flow of material while preventing flow of gas therethrough, means for feeding the material toward said passages, and a scrubber, in combination with a combustion chamber for heating and deodorizing gases, said combustion chamber having an inlet and an outlet, and means for regulating the flow of gases from the apparatus and between the aforesaid elements to utilize the upper section of said heating unit as a heating section and the lower section as either a drying or an incinerating section comprising ducts connecting the lower compartments of said sections to the scrubber, ducts connecting said scrubber to said combustion chamber and to an upper compartment of said lower section to conduct scrubbed gases thereto, ducts connecting upper compartments of said second section to the inlet of said combustion chamber, ducts connecting outlets of said combustion chamber to the upper compartments of said sections, and valves in said ducts.

13. The combination according to claim 12 in combination with means for discharging excess hot gases from said combustion chamber and means for heating gases from the scrubber by means of said excess hot gases.

WARREN S. MARTIN.

References Cited in the file of this patent

UNITED STATES PATENTS

| Number | Name | Date |
|---|---|---|
| 2,026,969 | Flynn | Jan. 7, 1936 |
| 2,114,566 | Lewers | Apr. 19, 1938 |
| 2,119,601 | Raisch | June 7, 1938 |
| 2,286,309 | Rowen | June 16, 1942 |

FOREIGN PATENTS

| Number | Country | Date |
|---|---|---|
| 432,198 | Great Britain | July 18, 1935 |